Oct. 30, 1923.
W. L. LINDGREN
CLUTCH
Filed Aug. 4, 1921
1,472,479
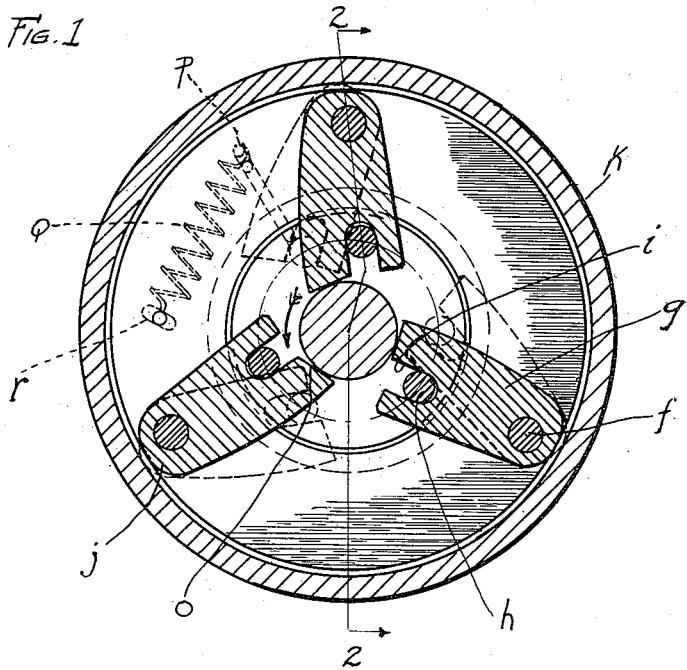
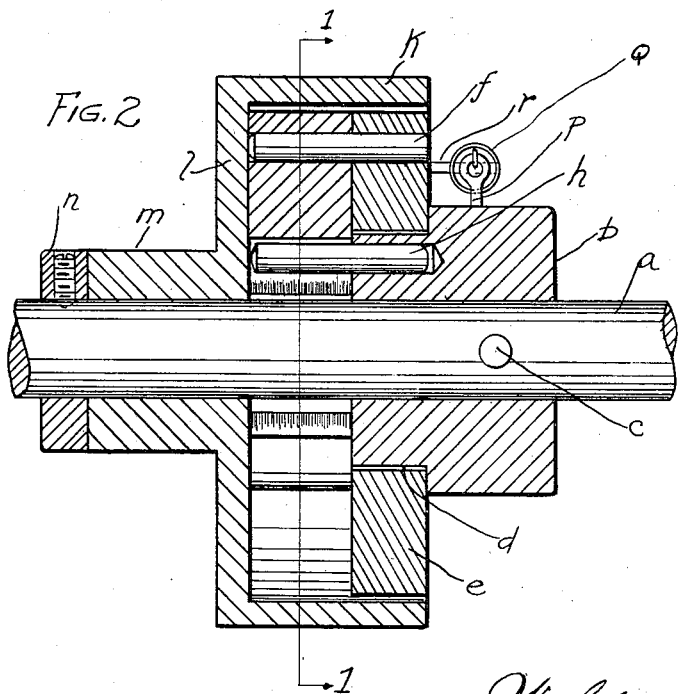
INVENTOR,
Waldemar L. Lindgren,
BY John Howard McElroy
his ATTORNEYS.

Patented Oct. 30, 1923.

1,472,475

UNITED STATES PATENT OFFICE.

WALDEMAR L. LINDGREN, OF CHICAGO, ILLINOIS, ASSIGNOR OF ONE-HALF TO JOHN E. ERICSSON, OF CHICAGO, ILLINOIS.

CLUTCH.

Application filed August 4, 1921. Serial No. 489,681.

*To all whom it may concern:*

Be it known that I, WALDEMAR L. LINDGREN, a citizen of the United States, and a resident of Chicago, in the county of Cook and State of Illinois, have invented certain new and useful Improvements in Clutches, of which the following is a full, clear, and exact specification.

My invention is concerned with one way automatic clutches to connect rotating members, and it is designed to produce a device of the class described that shall be simple in its construction, yet effective in its operation, and which shall not require extreme accuracy in its construction.

To illustrate my invention, I annex hereto a sheet of drawings, in which the same reference characters are used to designate identical parts in all the figures, of which—

Fig. 1 is a section on the line 1—1 of Fig. 2; and

Fig. 2 is a section on the line 2—2 of Fig. 1.

I have shown my invention as employed in connection with a driving shaft $a$, which has the sleeve or hub $b$ secured thereto by the pin $c$. This hub is provided with the reduced portion $d$ forming a seat for an annulus $e$ interposed between it and the annular periphery $k$ of the cup-shaped driven member $l$ having the hub $m$ journaled on the shaft $a$ and held in place by the collar $n$ secured on the shaft, as shown. The annulus $e$ has secured therein near its periphery a plurality, preferably 3, of pins $f$ the inner ends of which serve as bearing studs for the corresponding plurality of clutch dogs $g$ pivoted thereon. These clutch dogs have the recesses $i$ in their inner ends engaged by the pins $h$ secured in the hub $b$, as clearly shown in Fig. 2. The dogs $g$ have their outer ends shaped eccentrically relative to the pivots $f$ so as to produce gripping surfaces $j$ which engage the inner periphery of the annulus $k$ when the dogs are swung to the dotted line position, shown in Fig. 1, by the relative rotation of the hub $b$. To hold the dogs $g$ substantially in the dotted-line position shown in Fig. 1, and ready to clutch instantly the shaft $a$ begins to rotate anticlockwise, I may employ the helically-coiled contractile spring $q$, which is secured at one end to the pin $p$ secured in the hub $b$ and at the other end to the pin $r$ projecting outwardly from the annulus $e$. The spring $q$ so connected tends to drag the annulus $e$ around the hub $b$ so that the dogs $g$ are ready to grip immediately without any lost motion, which lost motion would occur if they had first to move from the full-line position of Fig. 1 to the dotted-line position. In some cases, where I desire the lost motion or delayed action in clutching, I omit the spring $q$.

The operation of the device will be readily apparent: Assuming that the shaft $a$ is the driving member, and that it is rotating in the direction of the arrow as shown in Fig. 1, the pins $h$ acting on the power arms of the dogs $g$, considered as levers, results in swinging them to or toward the dotted line position shown in Fig. 1, in which the surfaces $j$ grip against the inner periphery of the ring $k$, and securely clutch the members $a$ and $l$ together so long as the shaft is rotating in the direction noted. When the shaft is stopped or reversed, the hub $b$ is pulled backward relatively to the ring $e$ until the ends $o$ of the dogs $e$ engage the shaft $a$. This of course unclutches the dogs $g$ from the annulus $k$, which now comes to rest.

It will of course be understood that the driven member $l$ will be provided with some driving connections, such as a crown, for a belt on the annulus $k$, or spur gear teeth on the hub $m$. It will be noted that there is considerable clearance between the inner periphery of the annulus $e$ and the hub $b$ and likewise between the outer periphery of the annulus $e$ and the inner periphery of the ring $k$. This clearance does not in any way interfere with the clutching action, and it obviates the necessity of fine workmanship in constructing and assembling the parts, as they can be more or less eccentric and still operate perfectly.

While I have shown and described my invention as embodied in the form which I at present consider best adapted to carry out its purposes, it will be understood that it is capable of modifications and that I do not desire to be limited in the interpretation of the following claims, except as may be necessitated by the state of the prior art.

What I claim as new and desire to secure by Letters Patent of the United States is:

1. In a clutch, the combination with a rotatable driving member, of a rotatable driven member concentric therewith, a ring interposed between the two members, a plurality of pins projecting inward from the ring toward the bottom of the annular driven members, a corresponding plurality of clutch dogs pivoted on the pins having their outer ends eccentric and adapted to engage the inner periphery of the annular driven member, and their inner ends slotted, and a corresponding plurality of pins extending from the rotatable driving member into the slotted ends of the clutch dogs.

2. In a clutch, the combination with a rotatable driving member, of an annular driven member concentric therewith, a ring interposed between the two members, a plurality of clutch dogs pivoted on the ring and having their clutching ends shaped so that as they are swung to clutching position they wedge between their pivots and the inner periphery of the driven member, and a corresponding plurality of elements carried by the driving member directly engaging and adapted to swing the clutch dogs to clutching position when the driving member is rotated in one direction and to unclutching position when it is rotated in the other direction.

3. In a clutch, the combination with a rotatable driving member, of an annular driven member concentric therewith, a ring interposed between the two members, a clutch dog pivoted on the ring near its outer end, which end is eccentric to the pivot and so shaped that when it is swung to clutching position it wedges between its pivot and the inner periphery of the driven member, and an element carried by the driving member cooperating with a slot in the clutch dog to swing the latter to clutching position when the driving member is rotated in one direction and to unclutching position when it is rotated in the other.

4. In a clutch, the combination with a rotatable driving member, of an annular driven member concentric therewith, a ring interposed between the two members, a clutch dog pivoted on the ring near its outer end, which end is eccentric to the pivot and adapted to engage the inner periphery of the driven member, and an element carried by the driving member cooperating with a slot in the clutch dog to swing the latter to clutching position when the driving member is rotated in one direction and to unclutching position when it is rotated in the other, the inner end of the clutch dog being shaped so as to engage the driving member to limit its swinging movement when the driving member is reversed.

5. In a clutch, the combination with a driving shaft having a collar with a reduced portion secured thereon, of a cup-shaped driven member having a hub mounted to rotate on the shaft but held from longitudinal movement thereon, a ring located between the reduced portion of the collar and the inner periphery of the cup, a plurality of pins projecting inward from the annulus toward the bottom of the cup, a corresponding plurality of clutch dogs pivoted on the pins having their outer ends eccentric and adapted to engage said inner periphery, and their inner ends slotted, and a corresponding plurality of elements extending from the collar into the slotted ends of the clutch dogs, for the purpose described.

6. In a clutch, the combination with a driving shaft having a collar with a reduced portion secured thereon, of a cup-shaped driven member having a hub mounted to rotate on the shaft but held from longitudinal movement thereon, a ring located between the reduced portion of the collar and the inner periphery of the cup, a plurality of pins projecting inward from the annulus toward the bottom of the cup, a corresponding plurality of clutch dogs pivoted on the pins, having their outer ends eccentric and adapted to engage said inner periphery, and their inner ends slotted, a corresponding plurality of elements extending from the collar into the slotted ends of the clutch dogs, and spring connections between the driving member and the ring to draw the latter to unclutching position when the rotation is reversed.

7. In a clutch, the combination with a driving shaft having a collar with a reduced portion secured thereon, of a cup-shaped driven member having a hub mounted to rotate on the shaft but held from longitudinal movement thereon, a ring located between the reduced portion of the collar and the inner periphery of the cup, a plurality of pins projecting inward from the annulus toward the bottom of the cup, a corresponding plurality of clutch dogs pivoted on the pins having their outer ends eccentric and adapted to engage said inner periphery, and their inners ends slotted, a corresponding plurality of elements extending from the collar into the slotted ends of the clutch dogs, a pin projecting outwardly from the collar, a second pin projecting outwardly from the ring, and a helically coiled contractile spring connecting the last two mentioned pins, for the purpose described.

In witness whereof I have hereunto set my hand and affixed my seal, this 29th day of July, A. D. 1921.

W. L. LINDGREN. [L. S.]

Witness:
JOHN HOWARD MCELROY.